(No Model.) 2 Sheets—Sheet 1.
N. SHAW.
MOLDING APPARATUS.
No. 581,781. Patented May 4, 1897.
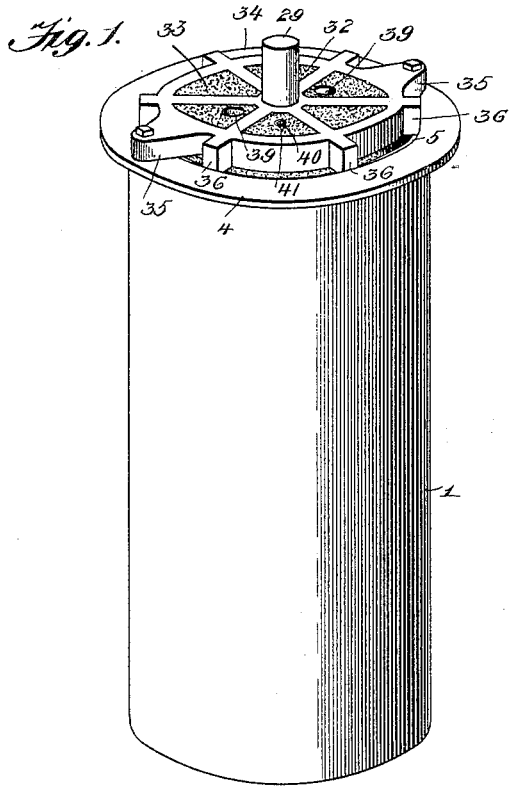
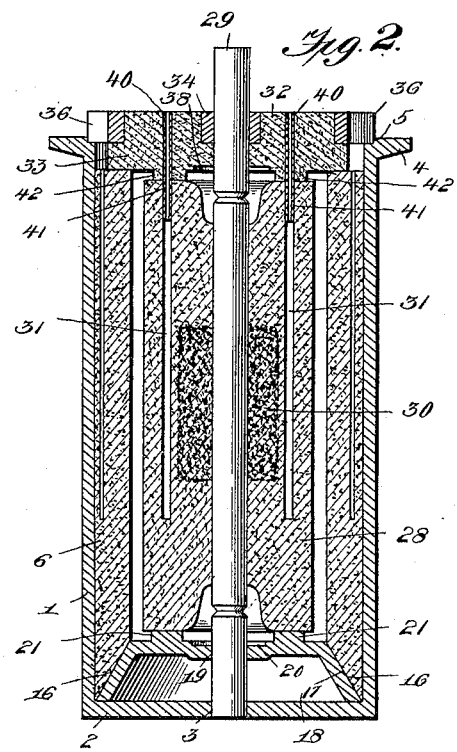
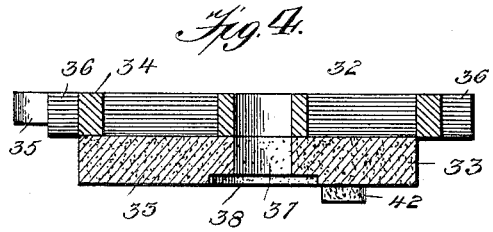
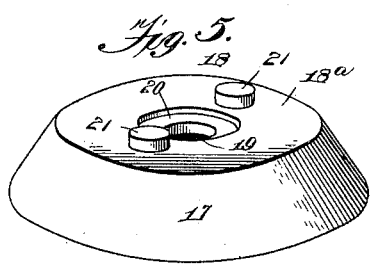
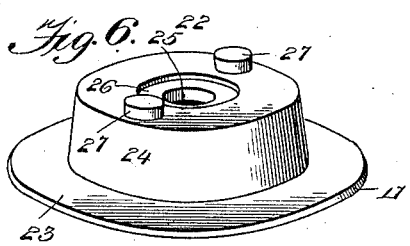
Witnesses
John C Shaw
D P Holhauster
Inventor
Noah Shaw,
By his Attorneys,
C A Snow & Co.

(No Model.) 2 Sheets—Sheet 2.
N. SHAW.
MOLDING APPARATUS.
No. 581,781. Patented May 4, 1897.
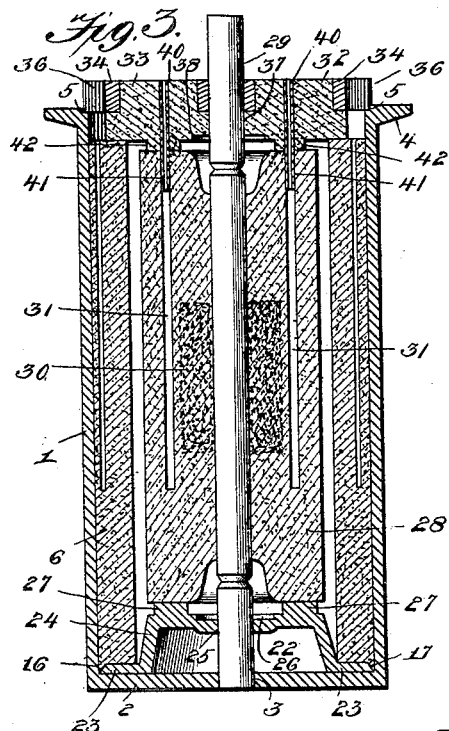
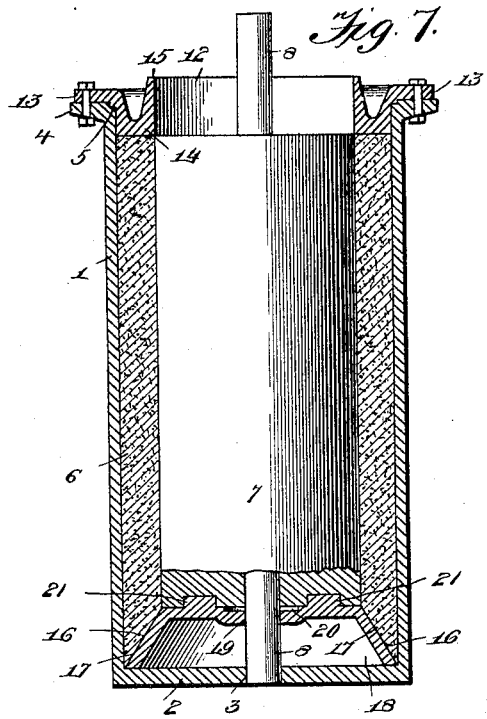
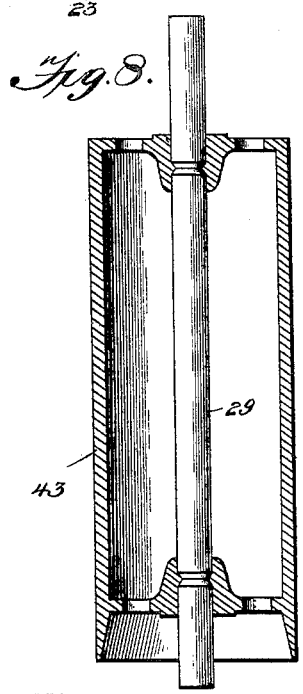
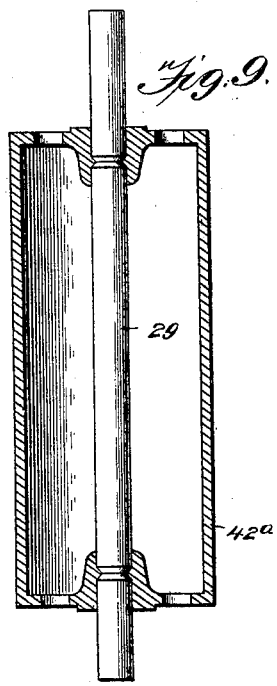
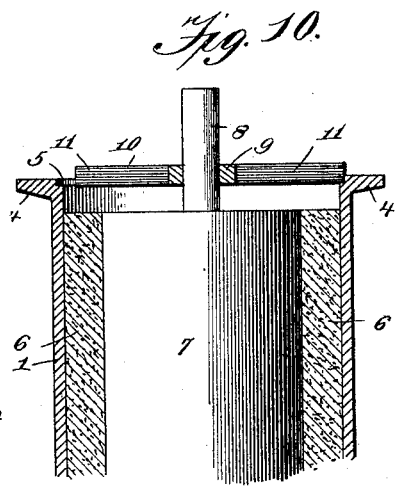
Witnesses
John C. Shaw
D. P. Wolhaupter
Inventor
Noah Shaw,
By his Attorneys,
C. A. Snow & Co.

UNITED STATES PATENT OFFICE.

NOAH SHAW, OF EAU CLAIRE, WISCONSIN.

MOLDING APPARATUS.

SPECIFICATION forming part of Letters Patent No. 581,781, dated May 4, 1897.

Application filed September 24, 1895. Serial No. 563,551. (No model.)

*To all whom it may concern:*

Be it known that I, NOAH SHAW, a citizen of the United States, residing at Eau Claire, in the county of Eau Claire and State of Wisconsin, have invented a new and useful Molding Apparatus, of which the following is a specification.

This invention relates to molding apparatus for molding cast-iron molds; and it has for its object to provide an apparatus of this character having simple and efficient means for quickly casting iron rolls perfectly true and in balance, so as to require no finishing whatever after leaving the foundry. In securing this result the invention contemplates certain improvements in the molding apparatus set forth in the contemporaneously-pending application, Serial No. 563,550.

With these objects in view the invention consists in the novel construction, combination, and arrangement of parts hereinafter more fully described, illustrated, and claimed.

In the drawings, Figure 1 is a perspective view of a molding apparatus embodying the improvements contemplated by this invention. Fig. 2 is a central vertical sectional view thereof. Fig. 3 is a similar view showing the bottom mold-head for forming a mold with a recessed end. Fig. 4 is a detail transverse sectional view of the mold-cover. Figs. 5 and 6 are details in perspective of the bottom mold-heads for forming rolls, respectively, with unrecessed and recessed ends. Fig. 7 is a vertical sectional view of the mold with the pattern therein and showing the guard-ring in position. Figs. 8 and 9 are longitudinal sectional views of hollow metal rolls formed by the molding apparatus and provided, respectively, with unrecessed and recessed ends. Fig. 10 is a sectional view of the apparatus, showing the manner of holding the pattern in place.

Referring to the accompanying drawings, the numeral 1 designates an upright iron flask provided with a flat bottom 2, having a central shaft-opening 3, and at its upper open end with an offstanding annular flange 4 and an inner annular shoulder 5, the function of which will be more particularly referred to.

The flask 1 accommodates therein a cylindrical mold body or filling 6, which may be made of green sand. The cylindrical mold body or filling is made within the flask by packing the sand in the latter around a solid cylindrical pattern 7, provided with upper and lower spindle-extremities 8, the lower of which fits in the shaft-opening 3 in the bottom of the flask and the upper of which fits in the spindle-collar 9 of a steadying-spider 10, having a series of radially-extending arms 11, the outer extremities of which rest in the shoulder 5 at the top of the flask and serve to steady the pattern while the sand is being packed around the same. After having packed the mold body or filling 6 the pattern is withdrawn; but ordinarily in drawing the pattern the upper end or surface of the mold body or filling 6 is broken or the sand disturbed, which, if not repaired, would leave the mold in an imperfect condition at its upper end. To avoid this, after the steadying-spider 10 is removed a guard-ring 12 is employed, which ring has an opening of the same diameter as the pattern.

The guard-ring 12 is adapted to be secured on top of the flask and is provided with diametrically opposite bolt-lugs 13, which provide means for bolting the guard-ring in position, and the latter is further provided with a depending thickened rest-flange 14, which registers within the top of the flask and is provided with a flat lower side, which rests on and registers with the top edge of the sand body or filling 6. The ring 12 has extended upwardly from the inner circle thereof an elongated guide-flange 15, which serves as a guide for the pattern as it is withdrawn from within the body or filling 6, and as the inner periphery of the flange 15 alines with the inner sides of the body or filling 6 it will be readily apparent that when the pattern is withdrawn it will be impossible for the same to disturb or otherwise impair the top edges of the said mold body or filling.

The mold body or filling 6 is provided at its inner lower edge with an annular bevel 16, which registers with the beveled outer edge 17 of a metal bottom mold-head 18. The head 18 removably rests on the bottom of the flask and is of a substantially inverted-cup shape, having a flat top portion 18ᵃ, provided with a central shaft-opening 19 and annular metal recess 20, surrounding said opening, and a pair of diametrically opposite spacing-studs 21, projected upwardly from the flat top portion 18ª, at opposite sides of the recess 20. The bottom mold-head 18 is employed in connection with the apparatus for casting metal rolls with unrecessed ends; but the bottom mold-head designated by the numeral 22 is of a slightly-modified construction, so as to provide for forming recesses in the lower ends of the cast-metal rolls. The beveled outer edge 17 of the mold-head 22 is formed at the outer edge of the flat base-flange 23, which rests flat on the bottom of the flask, and from which flange rises an upwardly-projected core portion 24, having in the top thereof a central shaft-opening 25 and an annular recess 26, surrounding said shaft-opening. From the top of the upwardly-projected core portion 24 is projected a pair of diametrically opposite spacing-studs 27, corresponding to the studs 21 of the form of mold-head designated by the numeral 18.

By reference to the drawings it will be apparent that when the molten metal is introduced into the mold, when the mold-head 18 is employed, the flat top portion of said mold-head is the only part thereof presented to the metal, so that a perfectly flat unrecessed head is formed on the roll cast in the apparatus; but when the mold-head 22 is employed the metal will entirely surround the core portion 24 thereof, so as to form a recess in one end of the roll, as illustrated in Fig. 8 of the drawings.

The cylindrical mold body or filling 6 is adapted to receive therein the smaller cylindrical sand core 28, which is shaped and dried on the roll-shaft 29, on which is cast the roll. The cylindrical sand core 28 is solid and partially formed by a filling of cinders or broken coke 30, which during the formation of the core are packed around the central portion of the shaft 29, and the said core is provided centrally in each end and directly surrounding the shaft 29 with the inwardly-extending conically-shaped metal recesses 30, which receive the molten metal as the same is poured into the mold. The core 28 is provided at its upper end at diametrically opposite sides of the shaft 29 with the vent-openings 31, which extend a sufficient distance into the body of the core to provide for the escape of gases therefrom, and when placed in position within the body or filling 6 the lower end of the sand core rests directly on top of the spacing-studs projecting from the upper side of the bottom mold-head in the bottom of the flask. The said spacing-studs therefore support the lower end of the core out of contact with the bottom mold-head, so as to leave a space which forms one of the heads of the hollow metal roll, and the said studs also provide means for forming openings in one head of the hollow metal roll, through which openings the sand forming the core is removed after the roll is cast.

When the core is positioned within the mold body or filling 6, the same is held therein and properly steadied by means of the removable mold-cover 32. The removable mold-cover 32 essentially consists of a solid circular sand body 33, projected at one side of and packed and dried within the open spaces of a circular skeleton metal frame 34, which supports the said body. The circular skeleton metal frame 34 is provided at its rim with offstanding bolt-lugs 35 and a series of projections 36, which rest in the annular shoulder 5 at the top of the flask and provide means for firmly steadying the mold-cover in position at the top of the flask. The mold-cover 32 is provided with a central shaft-opening 37, which receives the upper extremity of the shaft 29, the lower extremity of which projects through the shaft-opening in the bottom mold-head, and at the lower end of the shaft-opening the mold-cover is provided with an annular recess 38, corresponding to the annular recess surrounding the shaft-opening of the bottom mold-head.

The mold-cover 32 is additionally provided with diametrically opposite tapered pouring-openings 39 and at a point intermediate of said pouring-openings with diametrically opposite pipe-openings 40, in which are removably fitted the vent-pipes 41, which are designed to project into the upper ends of the vent-openings at the top of the core to provide for carrying off the gases from said core.

At the lower ends of the pipe-openings 40 the sand body of the mold-cover 32 is provided with the downwardly-extending short spacing projections 42, which are designed to bear on top of the core and act in the capacity of chaplets to hold the core in place and also provide an intermediate space between the bottom of the mold-cover and the top of the core, so as to form one of the heads and openings in such head of the hollow metal roll, as will be readily understood by those skilled in the art.

With the parts of the apparatus assembled together as described the molten metal is poured through the pouring-openings in the mold-cover and fills the space between the core and the inside of the body or filling 6, and also the spaces between the bottom of the core and the bottom mold-head and the top of the core and the bottom of the mold-cover, thereby forming either of the hollow metal rolls 42ª or 43, according to whether the head 18 or 22 is employed.

Changes in the form, proportion, and the minor details of construction may be resorted to without departing from the principle or sacrificing any of the advantages of this invention.

Having thus described the invention, what is claimed, and desired to be secured by Letters Patent, is—

1. In a mold, the upright cylindrical flask, a metal bottom mold-head fitted within the bottom of the flask and provided on the top portion thereof with short upwardly-projected spacing-studs, a cylindrical sand mold body or filling packed within the flask on top of the edge of the mold-head, a solid cylindrical sand core carrying a vertical shaft and resting at its lower end directly on the short spacing-studs of the mold-head, and a mold-cover removably fastened on top of the flask and having a sand body provided on its lower side with downwardly-extending short spacing projections adapted to bear directly on top of the core, substantially as set forth.

2. In a mold, an upright cylindrical flask, a separate mold-head fitted in the bottom of the flask and provided on its top portion with short upwardly-projected spacing-studs, a cylindrical sand mold body or filling packed within the flask on top of the edge of the mold-head, a solid cylindrical sand core carrying a vertical shaft and resting at its lower end on said spacing-studs, said core being provided with vent-openings leading downward from its flat upper end, a mold-cover provided with a sand body having pipe-openings therein and short spacing projections at the lower end of said openings and contacting with the top of the core, and vent-pipes fitted in the pipe-openings of the cover and its spacing projections and adapted to be extended into the upper ends of the vent-openings in the core, substantially as set forth.

3. In a molding apparatus, the combination with an upright flask, and a cylindrical pattern; of a detachable guard-ring removably secured on the upper end of the flask and having an opening of the same diameter as the cylindrical pattern, said ring being provided with a depending thickened rest-flange registering inside of the open end of the flask and provided with a flat lower side extending from the inner side of the flask to the periphery of the pattern, and also with an upwardly-extending elongated circular guide-flange 15, the inner periphery of which coincides with the opening through the ring, substantially as set forth.

In testimony that I claim the foregoing as my own I have hereto affixed my signature in the presence of two witnesses.

N. SHAW.

Witnesses:
  A. C. PUTNAM,
  H. G. STEARNS.